Patented Nov. 28, 1922.

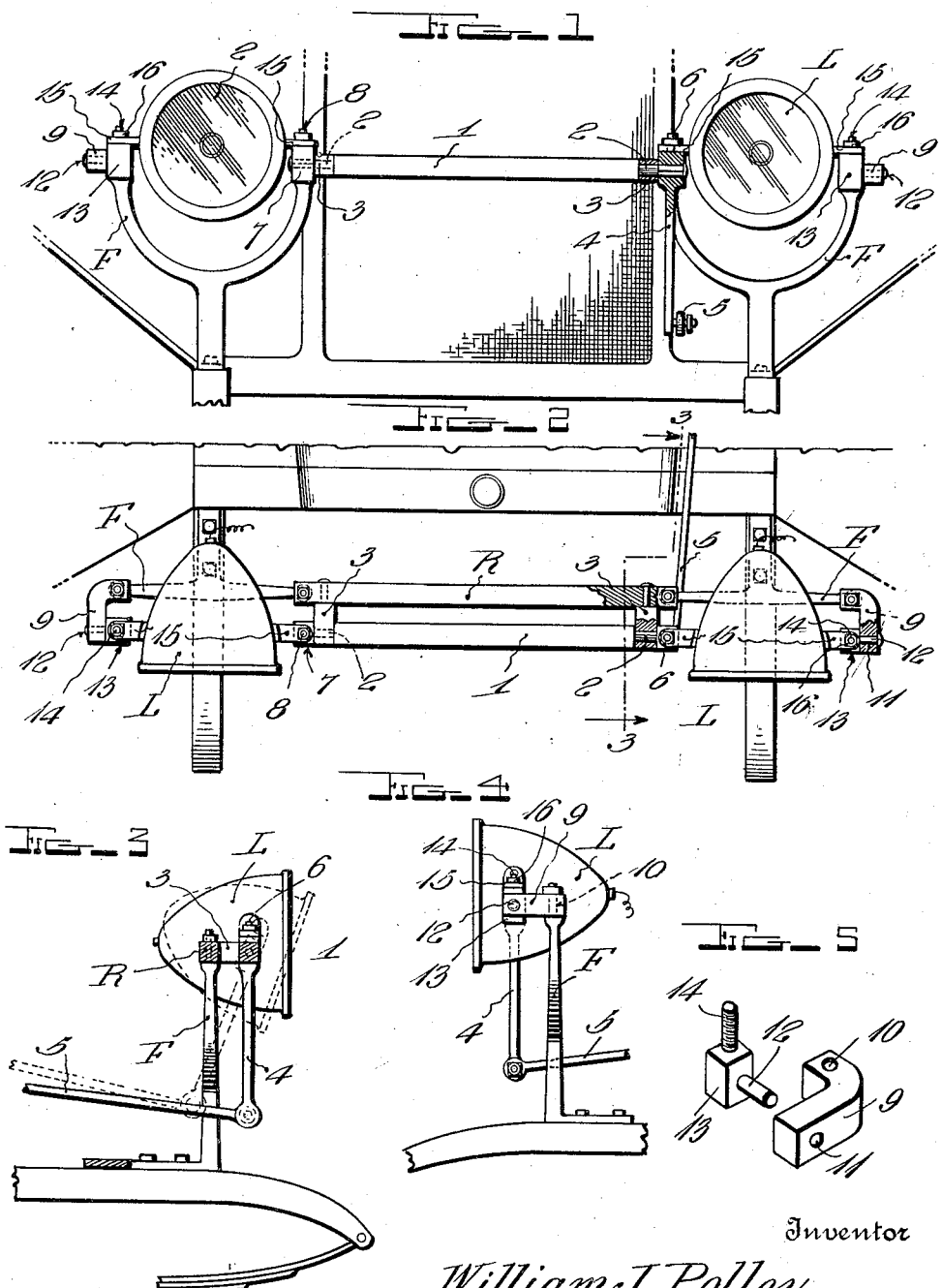

1,437,355

UNITED STATES PATENT OFFICE.

WILLIAM JESSE POLLEY, OF HAINES, OREGON.

AUTOMOBILE LAMP-MOUNTING MEANS.

Application filed March 30, 1922. Serial No. 548,028.

*To all whom it may concern:*

Be it known that I, WILLIAM JESSE POLLEY, a citizen of the United States, residing at Haines, in the county of Baker and State of Oregon, have invented certain new and useful Improvements in Automobile Lamp-Mounting Means; and I do declare the following to be a full, clear, and exact description of the invention, such as will enable others skilled in the art to which it appertains to make and use the same.

This invention relates to an improved means for mounting automobile headlights, and it has for its principal object to devise means which is such in construction that it permits the headlight to be tilted vertically to enable the rays of light to be thrown immediately against the road surface in front of the automobile so as to prevent the light rays from blinding the driver of an approaching machine.

Another object of the invention is to generally improve upon similar patented and marketed devices by providing one of extreme simplicity and durability, the same being such in construction that it can be applied without requiring extensive alterations of the existing parts of the automobile with which it is associated.

Other objects and advantages of the invention will be apparent during the course of the following description.

In the accompanying drawings forming a part of this specification and in which like numerals are employed to designate like parts throughout the same:

Figure 1 is a front elevational view of a portion of an automobile showing the usual headlight mounting means and the improved means associated therewith to permit the headlights to be moved, a portion of the last named means being shown in section.

Figure 2 is a top plan view thereof with portions broken away and shown in section to illustrate the construction more clearly.

Figure 3 is a section taken substantially on the plane of the line 3—3 of Fig. 2 showing, in dotted lines, the position the lamp assumes when tilted.

Figure 4 is a side elevational view.

Figure 5 is a perspective view of one of the connecting members employed for connection to the lamp fork.

In the drawings, the headlights or lamps are designated by the letters L and the usual stationary forks by the letters F, while the cross-rod which connects with these is designated by R.

Ordinarily, the lamps are mounted between the arms of the forks in a manner which prevents them from being moved with respect to the latter. I aim to associate with the usual mounting means, supplemental means which will enable the lights to be tilted vertically, and this means, as before indicated, does not require extensive alterations of any of the existing parts of the vehicle with which it is directly associated. The means in its preferred form comprises a rock shaft 1 having reduced journals 2 at its opposite ends which are rotatable in the openings of the bearing members 3 secured to the cross-rod R adjacent the opposite ends thereof. The journals of this rock shaft extend beyond these bearing members and an arm 4 is connected with one of these journals as shown in Fig. 1, this arm depending below the rock shaft to permit an operating member 5 to be connected therewith. It is understood that the operating member 5 will extend rearwardly to any suitable point on the vehicle to permit it to be conveniently operated either by a foot pedal or a hand lever, whichever may be preferred. It is to be noted that the arm is provided on its upper end with a reduced screw-threaded extension 6 which serves a purpose to be hereinafter described. Referring now to the opposite journal, it will be seen that a small connecting member 7 is rigidly connected thereto, this member being likewise formed with an upwardly directed reduced screw-threaded extension 8.

As before intimated, the invention embodies novel means for pivotally connecting the lamps with the supporting forks and although this means could be of any other construction, it preferably comprises, in both instances, a bracket 9 (see Fig. 5), the same being formed with a vertical hole 10 to receive the reduced upper end of the outer fork arm, the bracket being formed adjacent its opposite end with a horizontal opening 11 to accommodate and rotatably receive the stub-axle 12 of a pivot member 13. This member 13, like the aforesaid arm and connecting member is equipped with a reduced screw-threaded extension 14. It may be conveniently mentioned here that both lamps are equipped with horizontal laterally disposed apertured ears 15 which extend from opposite sides and these ears are intended to be connected with the extensions 6, 8 and 14 in the manner shown. Nuts 16 are then threaded onto the extensions to positively connect the lamps thereto.

From the foregoing description, it will be seen that a rearward pull on the operating rod 5 will move the arm 4 toward the vehicle body. In so doing, the rock shaft 1 will be rotated. In view of the fact that the lamps have connection with this rod through the medium of the arm and connecting member 7, it will be seen that they will be tilted vertically, this tilting movement being permitted by the swinging of the members 13. Hence, the parts will assume the approximate position shown in dotted lines in Fig. 3. When in this position, the light rays will be thrown on the road surface immediately in front of the machine. Consequently, they will not trouble the driver of an approaching machine. As soon as the machine has passed, the parts can be returned to their normal position and the light rays governed so as to cause them to assume the desired angle for safe driving.

By carefully considering the description in connection with the drawings, persons familiar with devices of this class will doubtless be able to obtain a clear understanding of the invention. Therefore, a more lengthy and detailed description of the invention is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. A headlight mounting comprising a pair of bearing members to be connected with and extending forwardly of the existing cross-rod between and connected with the inner arm of the usual lamp forks, a horizontal rock-shaft having at its ends pivot pins extending through and rotatable in the bearings, an operating arm connected to one of said pins and depending from said shaft, a carrier member secured to the other of said pins, said operating arm and carrier having their upper end portions adapted for connection with the inner mounting ears of a pair of lamps, bearing brackets to be connected with and extend forwardly from the outer arm of the fork, and carriers pivotally connected with the last mentioned bearing brackets and adapted for connection with the outer mounting ears of the lamp.

2. A headlight mounting to permit vertical tilting of the headlights comprising a pair of bearing members to be connected with and extend forwardly of the cross-rod extending between and connected with the inner ears of the usual headlight mounting fork, a rock-shaft having reduced pivot pins at its opposite ends rotatable in said bearing members and extending beyond the same, a block fixed to the extended end portion of one of said pivot pins, an arm fixedly connected with the extended end portion of the remaining pivot pin, said block and arm being adapted for connection with the inner mounting ears of a pair of lamps, bearing brackets for connection to the outer arms of the supporting forks having forwardly projected portions provided with bearing openings, and blocks adapted for connection with the outer mounting ears of the lamps provided with pivot pins rotatably mounted in said bearing openings in the brackets.

In testimony whereof I have hereunto set my hand.

WILLIAM JESSE POLLEY.